United States Patent
Morris

(10) Patent No.: US 12,241,540 B2
(45) Date of Patent: Mar. 4, 2025

(54) SEALED COVER WITH NOZZLE

(71) Applicant: Allison Transmission, Inc., Indianapolis, IN (US)

(72) Inventor: Austin Morris, Avon, IN (US)

(73) Assignee: Allison Transmission, Inc., Indianapolis, IN (US)

(*) Notice: Subject to any disclaimer, the term of this patent is extended or adjusted under 35 U.S.C. 154(b) by 0 days.

(21) Appl. No.: 18/324,502

(22) Filed: May 26, 2023

(65) Prior Publication Data
US 2023/0399962 A1 Dec. 14, 2023

Related U.S. Application Data

(60) Provisional application No. 63/366,194, filed on Jun. 10, 2022.

(51) Int. Cl.
*F16H 57/04* (2010.01)

(52) U.S. Cl.
CPC ..... *F16H 57/0426* (2013.01); *F16H 57/0471* (2013.01); *F16H 57/043* (2013.01)

(58) Field of Classification Search
CPC ............... F16H 57/0426; F16H 57/043; F16H 57/0471; F16C 33/723
See application file for complete search history.

(56) References Cited

U.S. PATENT DOCUMENTS

| | | | | |
|---|---|---|---|---|
| 4,222,283 A | * | 9/1980 | Nagy | F16H 3/089 184/6.12 |
| 4,543,852 A | * | 10/1985 | Svab | F16H 37/022 475/210 |
| 4,644,815 A | * | 2/1987 | Kawano | F16H 3/089 184/6.12 |
| 4,930,601 A | * | 6/1990 | Leidecker | F16N 7/36 184/6.12 |
| 5,154,517 A | | 10/1992 | Hodge | |
| 5,295,920 A | * | 3/1994 | Sawasaki | F16H 37/022 475/210 |
| 6,318,501 B1 | * | 11/2001 | Udou | F16H 57/0426 184/6.12 |
| 8,177,648 B2 | | 5/2012 | Gooden et al. | |

(Continued)

FOREIGN PATENT DOCUMENTS

| | | |
|---|---|---|
| CA | 2742446 C | 12/2013 |
| CN | 217002980 U | 7/2022 |
| KR | 20080004146 A | 1/2008 |

*Primary Examiner* — Minh Truong
(74) *Attorney, Agent, or Firm* — Woodard, Emhardt, Henry, Reeves & Wagner, LLP

(57) ABSTRACT

A powertrain system includes a housing that defines a reservoir. A shaft is rotatably disposed in the housing, and the shaft defines a bore. A cap is positioned to seal the reservoir. The cap defines an opening configured to supply lubricant to the shaft. The opening in the cap is positioned proximal the shaft to spray the lubricant into the bore. In one form, the cap has a nozzle, and the nozzle defines the opening configured to supply the lubricant to the shaft. The shaft is configured to rotate about a rotational axis, and the bore extends along the rotational axis of the shaft. The nozzle is aligned with the rotational axis of the shaft to spray the lubricant into the bore in order to lubricate bearings and other parts of the system.

21 Claims, 8 Drawing Sheets

(56) References Cited

U.S. PATENT DOCUMENTS

| | | | |
|---|---|---|---|
| 8,708,105 B2* | 4/2014 | Sowul | F16H 57/0494 |
| | | | 184/11.1 |
| 9,322,467 B2* | 4/2016 | Biermann | F16H 57/0482 |
| 10,007,281 B2 | 6/2018 | Qiu et al. | |
| 2003/0070877 A1 | 4/2003 | Min et al. | |
| 2017/0146110 A1* | 5/2017 | Galab | F16H 57/043 |
| 2019/0093754 A1* | 3/2019 | Heki | F16H 57/0471 |
| 2019/0120295 A1* | 4/2019 | Saza | F16C 33/7883 |
| 2021/0323534 A1* | 10/2021 | Tsukizaki | B60K 6/40 |

* cited by examiner

SEALED COVER WITH NOZZLE

CROSS REFERENCE TO RELATED APPLICATIONS

This application claims the benefit of U.S. Patent Application No. 63/366,194, filed Jun. 10, 2022, which is hereby incorporated by reference.

BACKGROUND

Ensuring proper lubrication of gears, bearings, and other mechanical components of transmissions, engines, electric motors, and other mechanical systems is always a concern. Wear, overheating, and other issues can arise if these components are not properly lubricated. Improper or insufficient lubrication can lead to premature failure.

Thus, there is a need for improvement in this field.

SUMMARY

Seals are commonly used in many industries for controlling the flow of lubricants such as natural or synthetic oils. While rotary seals provide adequate sealing at high lubricant or oil pressures within transmissions and/or electric motors, it was discovered that such seals fail to properly function at lower pressures. Moreover, such rotary seals are quite expensive. A unique sealed lubrication cover or lube cap design has been developed to address these as well as other issues. For example, lube cap is able to operate at relatively low pressures. For instance, the lube cap can be used when the pressure is at most 125 kilopascals (kPa)

The lube cap is designed to facilitate oil or other lubricant flow from a lubricant reservoir into a channel or bore of a shaft without the use of a radial shaft seal or rotating seal ring. From the shaft, the lubricant lubricates and/or cools other components such as bearings. The cap includes a nozzle that sprays the lubricant into the bore of the shaft. The nozzle is configured to flow most of the lubricant from the reservoir into the bore of the shaft, but some of the oil is intentionally leaked or directed to lubricate one or more nearby bearings.

In one version, the cap is fixed to a housing proximal to one end of the shaft that is configured to rotate relative to the housing and cap. In this way, the cap separates the shaft from the reservoir containing the lubricant. The nozzle of the cap is configured to spray the lubricant from the reservoir into the bore of the shaft. In one form, the nozzle extends partially into the bore of the shaft. As the shaft rotates, the lubricant flows from the reservoir through the nozzle and into the bore. In one variation, a bearing, such as a double-row angular contact bearing, rotatably supports one end of the shaft, and another bearing rotatably supports the other end of the shaft. As the lubricant flows through the bore, these bearings are lubricated. The cap in some examples further includes at least one orifice positioned near the nozzle of the cap. The orifice helps to facilitate consistent lubricant flow from the reservoir to the bearings. In one form, the nozzle and cap are formed as a unitary component, but in other examples the nozzle is in the form of a separate insert that is attached to the cap. The nozzle is designed to be spaced from the shaft to form a gap where some of the lubricant flows in order to lubricate the nearby bearings.

The system and techniques as described and illustrated herein concern a number of unique and inventive aspects. Some, but by no means all, of these unique aspects are summarized below.

Aspect 1 generally concerns a system.

Aspect 2 generally concerns a power train system.

Aspect 3 generally concerns the system of any previous aspect including an electric motor.

Aspect 4 generally concerns the system of any previous aspect including a housing.

Aspect 5 generally concerns the system of any previous aspect in which the housing defines a reservoir.

Aspect 6 generally concerns the system of any previous aspect including a bearing.

Aspect 7 generally concerns the system of any previous aspect including a shaft.

Aspect 8 generally concerns the system of any previous aspect in which the shaft is an intermediate shaft.

Aspect 9 generally concerns the system of any previous aspect in which the shaft is rotatably disposed in the housing.

Aspect 10 generally concerns the system of any previous aspect including a bearing disposed between the shaft and the housing to facilitate rotation of the shaft.

Aspect 11 generally concerns the system of any previous aspect including an end plate.

Aspect 12 generally concerns the system of any previous aspect in which the end plate is secured to one end of the shaft.

Aspect 13 generally concerns the system of any previous aspect in which the end plate is configured to secure the bearing to the shaft.

Aspect 14 generally concerns the system of any previous aspect in which the bearing includes an inner race and an outer race.

Aspect 15 generally concerns the system of any previous aspect in which the end plate engages the inner race of the bearing.

Aspect 16 generally concerns the system of any previous aspect in which the shaft defines a bore.

Aspect 17 generally concerns the system of any previous aspect in which a cap is spaced from the end plate to facilitate flow of the lubricant to the bearing.

Aspect 18 generally concerns the system of any previous aspect in which the cap defines an orifice to supply the lubricant to the bearing.

Aspect 19 generally concerns the system of any previous aspect in which the cap positioned to seal the reservoir.

Aspect 20 generally concerns the system of any previous aspect in which the lubricant in the reservoir is under low pressure.

Aspect 21 generally concerns the system of any previous aspect in which the pressure of the lubricant is at most 125 kPa.

Aspect 22 generally concerns the system of any previous aspect in which the bore in the shaft is configured to transport lubricant.

Aspect 23 generally concerns the system of any previous aspect in which the shaft defines one or more lubrication channels configured to supply the lubricant from the bore to the outside of the shaft.

Aspect 24 generally concerns the system of any previous aspect in which the channels are configured to supply the lubricant to the bearing.

Aspect 25 generally concerns the system of any previous aspect including the cap.

Aspect 26 generally concerns the system of any previous aspect in which the cap positioned proximal to an end of the shaft.

Aspect 27 generally concerns the system of any previous aspect in which the cap defines an opening configured to supply lubricant to the shaft.

Aspect 28 generally concerns the system of any previous aspect in which the opening in the cap is positioned proximal the shaft to spray the lubricant into the bore.

Aspect 29 generally concerns the system of any previous aspect in which the cap has a nozzle.

Aspect 30 generally concerns the system of any previous aspect in which the nozzle defines the opening configured to supply the lubricant to the shaft.

Aspect 31 generally concerns the system of any previous aspect in which the shaft is configured to rotate about a rotational axis.

Aspect 32 generally concerns the system of any previous aspect in which the bore extends along the rotational axis of the shaft.

Aspect 33 generally concerns the system of any previous aspect in which the nozzle is aligned with the rotational axis of the shaft to spray the lubricant into the bore.

Aspect 34 generally concerns the system of any previous aspect in which the nozzle has a funnel shape.

Aspect 35 generally concerns the system of any previous aspect in which the bore at the nozzle has a beveled shape.

Aspect 36 generally concerns the system of any previous aspect in which the nozzle and the shaft at the bore define a nozzle gap configured to facilitate flow of at least some of the lubricant to the bearing.

Aspect 37 generally concerns the system of any previous aspect in which the nozzle extends into the bore in the shaft.

Aspect 38 generally concerns the system of any previous aspect in which the nozzle extends from the cap that defines the opening.

Aspect 39 generally concerns the system of any previous aspect including a cap seal.

Aspect 40 generally concerns the system of any previous aspect in which the cap is sandwiched between the bearing and reservoir.

Aspect 41 generally concerns the system of any previous aspect in which the cap includes a crown and a collar extending transverse to the crown.

Aspect 42 generally concerns the system of any previous aspect in which the cap has a lip extending from the collar.

Aspect 43 generally concerns the system of any previous aspect in which the lip is configured to engage the outer race of the bearing.

Aspect 44 generally concerns the system of any previous aspect in which the cap seal wraps around the collar of the cap.

Aspect 45 generally concerns the system of any previous aspect in which the lip of the cap retains the cap seal.

Aspect 46 generally concerns the system of any previous aspect in which the nozzle is integrally formed with the crown.

Aspect 47 generally concerns the system of any previous aspect in which the nozzle is a separate component attached to the crown.

Aspect 48 generally concerns the system of any previous aspect in which the collar is configured to engage the outer race of the bearing.

Aspect 49 generally concerns the system of any previous aspect in which the cap is configured to remain stationary as the shaft rotates.

Aspect 50 generally concerns the system of any previous aspect in which the cap seal is sandwiched between the cap and the housing.

Aspect 51 generally concerns the system of any previous aspect in which the nozzle extends outside of the bore.

Aspect 52 generally concerns the system of any previous aspect in which the nozzle is formed via a stamping process.

Aspect 53 generally concerns the system of any previous aspect in which the nozzle extends through the end plate.

Aspect 54 generally concerns the system of any previous aspect in which the nozzle has an end that is spaced from the shaft to promote leaking of the lubricant to lubricate bearings.

Aspect 55 generally concerns the system of any previous aspect in which the cap lacks rotary seals.

Aspect 56 generally concerns a method.

Aspect 57 generally concerns the method of any previous aspect in which the storing lubricant in a reservoir that is enclosed by a cap that has a nozzle.

Aspect 58 generally concerns the method of any previous aspect in which the rotating a shaft with a bore.

Aspect 59 generally concerns the method of any previous aspect in which the spraying the lubricant into the bore of the shaft with the nozzle while the shaft rotates.

Aspect 60 generally concerns the method of any previous aspect in which the rotating the shaft includes rotating the shaft using one or more bearings.

Aspect 61 generally concerns the method of any previous aspect in which the lubricating the bearings with the lubricant.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
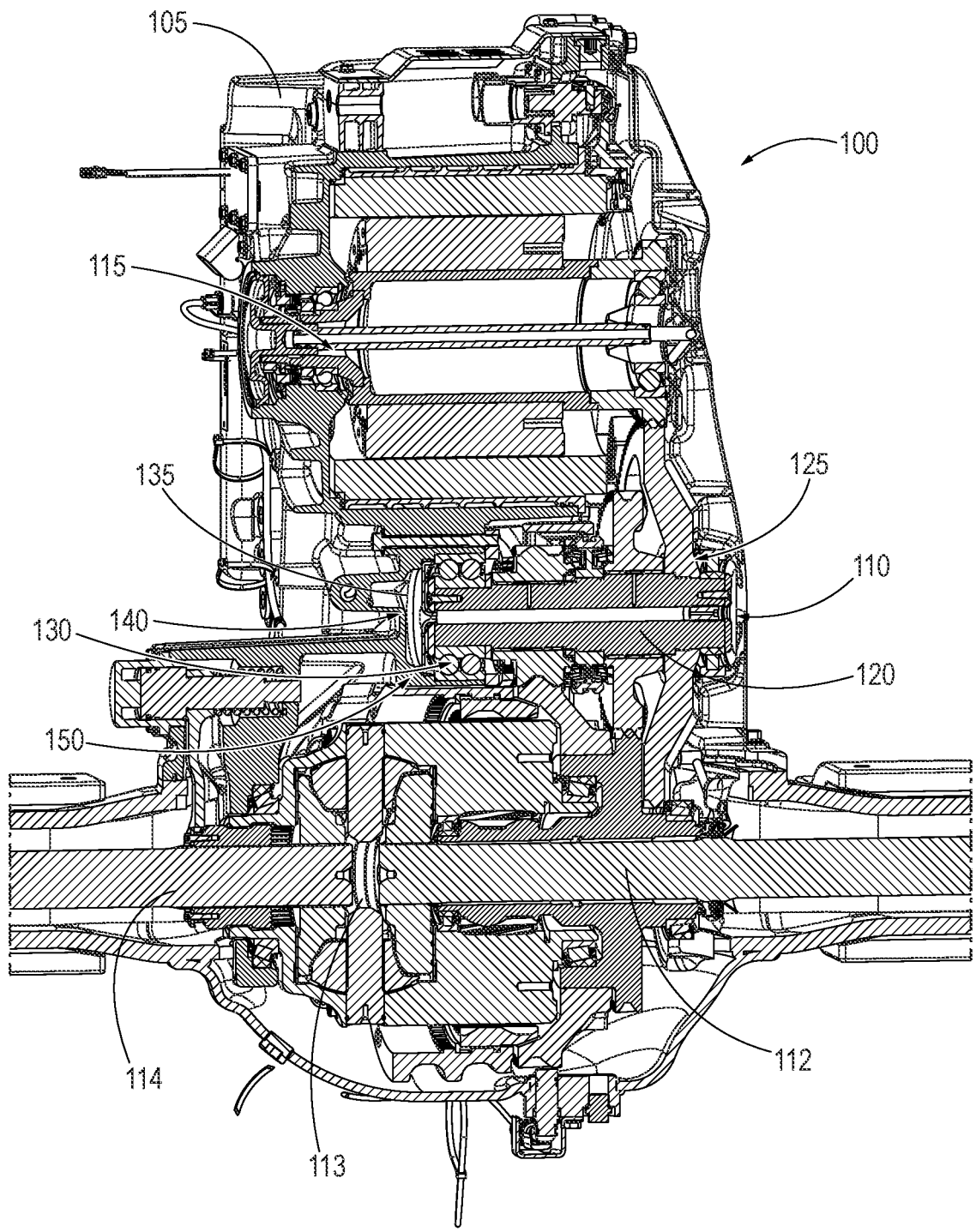
FIG. 1 is a cross-sectional view of an electric powertrain system according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 illustrates one example of an electric powertrain system 100 for a vehicle. In one form, the powertrain system 100 is configured to transfer power from an electric motor and/or internal combustion engine to one or more wheels of the vehicle. The powertrain system 100 includes a housing 105 that protects the operating components of the powertrain system 100 from exposure to the outside environment. The powertrain system 100 includes an intermediate shaft assembly 110, a first drive shaft 112, a differential 113, a second drive shaft 114, and an electric motor 115. The intermediate shaft assembly 110 is positioned in between the electric motor 115 and the first drive shaft 112 as well as the second drive shaft 114. According to one embodiment, the intermediate shaft assembly 110 is offset from the first drive shaft 112 and the second drive shaft 114. The electric motor 115 is in turn offset from the intermediate shaft assembly 110. In one form, the intermediate shaft assembly 110 extends parallel to the first drive shaft 112 and the second drive shaft 114. The electric motor 115 in turn extends parallel to the intermediate shaft assembly 110.

The differential 113 is operatively coupled between the first drive shaft 112 and second drive shaft 114. The first drive shaft 112 and the second drive shaft 114 axially extend from the differential 113 to outside of the housing 105. The electric motor 115 generates and delivers power to the intermediate shaft assembly 110. The intermediate shaft assembly 110 then transfers the power to the first drive shaft 112 along with the second drive shaft 114 via the differential 113. Outside the housing 105, the first drive shaft 112 and the second drive shaft 114 are coupled to the wheels of the vehicle. The differential 113 allows wheels to rotate at different speeds when turning the vehicle.

The intermediate shaft assembly 110 includes an intermediate shaft 120, a distal bearing system 125, a proximal bearing system 130, and a sealed reservoir cover or lube cap 135. The distal bearing system 125 and the proximal bearing system 130 are coupled to the intermediate shaft 120 to facilitate rotation of the intermediate shaft 120. The distal bearing system 125 is positioned at the end of the intermediate shaft 120 that is opposite to the cap 135. The proximal bearing system 130 is positioned along the intermediate shaft 120 proximal to the cap 135. In one form, the proximal bearing system 130 helps to retain the cap 135 in place. The cap 135 and the housing 105 define a reservoir 140. The reservoir 140 is fluidly connected to a lubricant supply passage 150. A lubrication pump in the powertrain system 100 pressurizes the lubricant, and the pressurized lubricant is supplied to the reservoir 140 through the lubricant supply passage 150. The reservoir 140 is configured to store lubricant which is then supplied to the intermediate shaft 120. In one form, the pressure of the lubricant in the reservoir 140 is relatively low. In one particular example, the pressure of the lubricant is at most distal bearing system 125 kilopascals (kPa). As noted before, this lower pressure in the reservoir 140 is generally difficult to seal with conventional radial or rotary seals. The configuration of the cap 135 along with the other components of the powertrain system 100 facilitates proper sealing and lubrication of the intermediate shaft assembly 110 without the need for these relatively expensive and problematic rotary seals.

Figure 2:
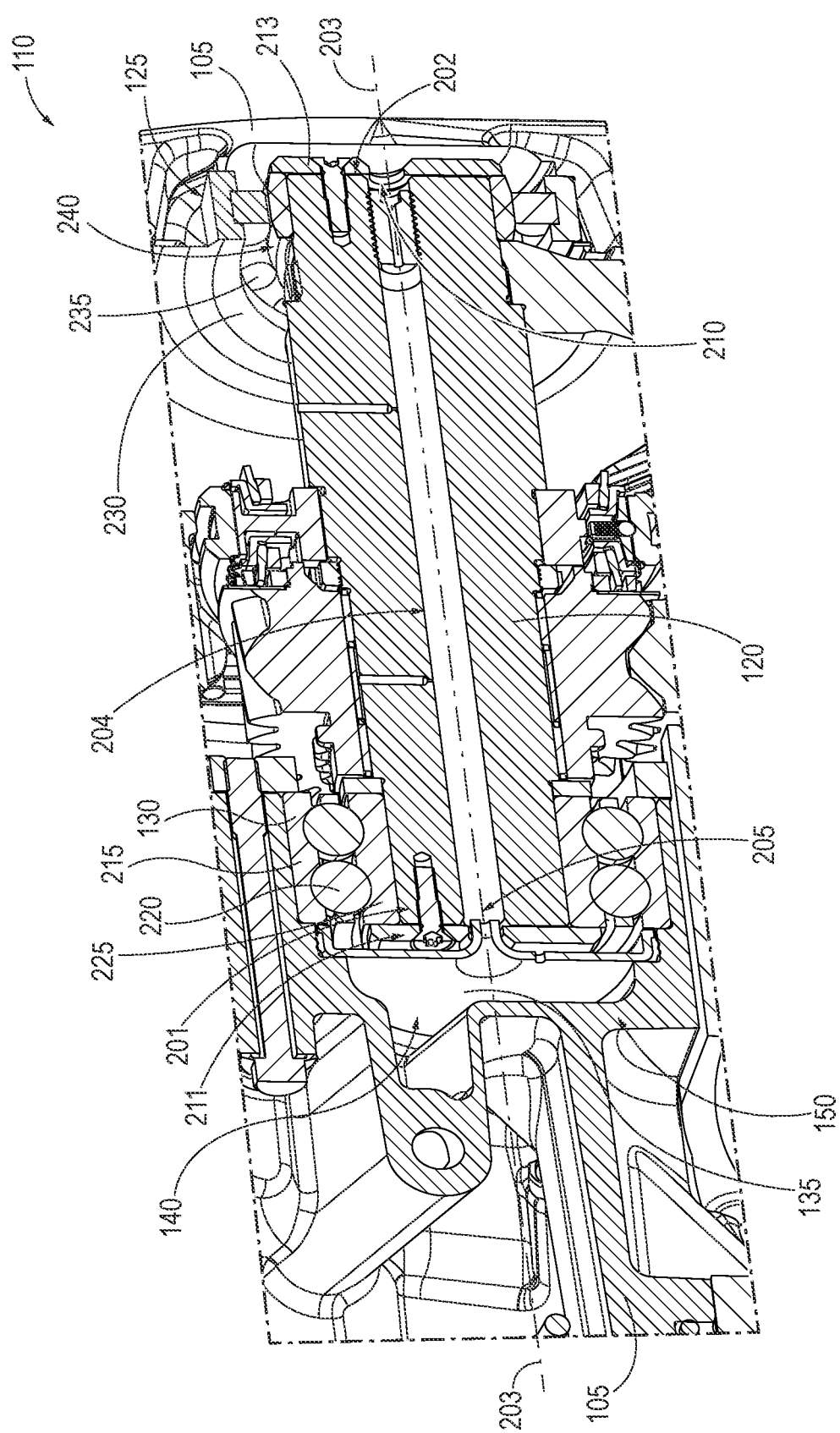
FIG. 2 is a cross-sectional perspective view of the FIG. 1 powertrain system.

FIG. 2 shows a perspective cross-sectional view of the intermediate shaft assembly 110. The intermediate shaft 120 has a first end 201 and a second end 202. The intermediate shaft 120 extends between the first end 201 and the second end 202 along a rotational axis 203. The intermediate shaft 120 defines a bore 204. The bore 204 is positioned concentrically within the intermediate shaft 120 along the rotational axis 203. The bore 204 is designed to allow the lubricant to flow throughout the intermediate shaft 120 to lubricate components of the intermediate shaft assembly 110. The first end 201 of the bore 204 in the intermediate shaft 120 has a first opening 205. The first opening 205 is designed to facilitate lubricant flow into the bore 204 or out of the bore 204 to lubricate components of the intermediate shaft assembly 110. The second end 202 of the bore 204 has a second opening 210.

The intermediate shaft assembly 110 further includes a first end plate 211 and a second end plate 213. The first end plate 211 is secured to the first end 201 of the intermediate shaft 120 proximal to the cap 135. The first end plate 211 is adapted to retain the proximal bearing system 130 on the intermediate shaft 120, which in turn retains the cap 135 in place against the housing 105. In addition, the first end plate 211 constricts lubricant flow. The second end plate 213 is positioned in between the second end 202 of the intermediate shaft 120 and the housing 105. The second end plate 213 is secured to the second end 202 of the intermediate shaft 120. The second end plate 213 is adapted to retain the distal bearing system 125 in place. Similar to the first end plate 211, the second end plate 213 restricts lubricant flow.

As shown, the proximal bearing system 130 is positioned proximal to the cap 135. The proximal bearing system 130 includes a first end outer bearing race 215, one or more first end bearings 220, and a first end inner bearing race 225. The first end outer bearing race 215 is coupled to the housing 105. The first end inner bearing race 225 is coupled to the intermediate shaft 120. The first end bearings 220 are positioned between the first end outer bearing race 215 and first end inner bearing race 225. As should be appreciated, the first end bearings 220 facilitate rotational movement of the first end inner bearing race 225. In the illustrated example, the first end plate 211 extends radially beyond the first end 201 and couples to the first end inner bearing race 225. The first end plate 211 does not extend beyond the first end inner bearing race 225 or obstruct the first end bearings 220. The first end plate 211 retains the first end inner bearing race 225 on the outer surface of the intermediate shaft 120 so that the first end inner bearing race 225 cannot be displaced longitudinally beyond the first end 201 of the intermediate shaft 120. While the intermediate shaft 120 rotates, the first end inner bearing race 225 and the first end plate 211 rotate at the same angular speed with respect to the rotational axis 203 as the intermediate shaft 120 does. The first end bearings 220 ensures the first end outer bearing race 215 remain static relative to the intermediate shaft 120.

The distal bearing system 125 is positioned at the second end 202 which is distal to the cap 135. The distal bearing system 125 includes a second end bearing outer race 230, one or more second end bearings 235, and a second end bearing inner race 240. The second end bearing outer race 230 is coupled to the housing 105. The second end bearing inner race 240 is coupled to the intermediate shaft 120. The second end bearings 235 are positioned between the second end bearing outer race 230 and second end bearing inner race 240. As should be appreciated, the second end bearings 235 facilitate rotational movement of the second end bearing inner race 240. In the illustrated example, the second end plate 213 extends radially beyond the second end 202 and couples to the second end bearing inner race 240. The second end plate 213 does not extend beyond the second end bearing inner race 240 or obstruct the second end bearings 235. The second end plate 213 retains the second end bearing inner race 240 on the outer surface of the intermediate shaft 120 so that the second end bearing inner race 240 cannot displace longitudinally beyond the second end 202 of the intermediate shaft 120. While the intermediate shaft 120 rotates, the second end plate 213 and the second end bearing inner race 240 rotate at the same angular speed with respect to the rotational axis 203 as the intermediate shaft 120 does. The second end bearings 235 ensure the second end bearing outer race 230 remains static relative to the intermediate shaft 120.

Figure 3:
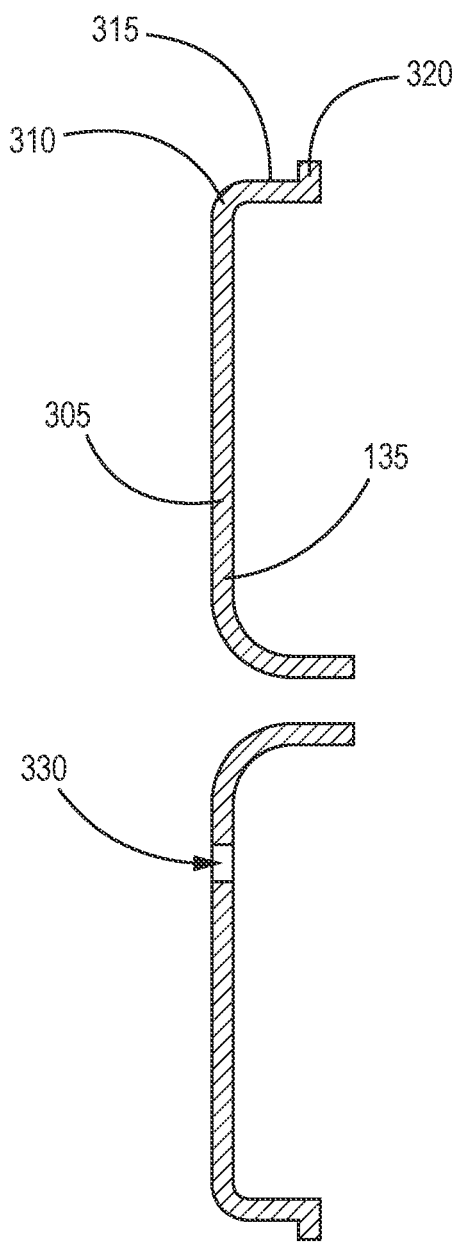
FIG. 3 is a cross-sectional view of a cap in the FIG. 1 powertrain system.

FIG. 3 illustrates a cross-sectional view of the cap 135. As shown, the cap 135 includes a crown 305, a cap edge 310, and a collar 315. In the illustrated example, the crown 305 has a circular shape, but the crown 305 can be shaped differently in other examples. The crown 305 is configured to retain lubricant within the reservoir 140. The cap 135 at the cap edge 310 bends or transitions from the crown 305 to the collar 315. The collar 315 extends transverse to the crown 305. At the cap edge 310, the cap 135 bends to have a rounded shape, but the cap edge 310 can have different shapes in other examples. The collar 315 in the example shown has a cylindrical shape, but the collar 315 can be shaped differently in other examples.

In the illustrated example, the collar 315 further includes a lip 320. The lip 320 extends radially outward from the collar 315 (i.e., away from the rotational axis 203) such that the lip 320 extends outside the outer diameter of the crown 305. The lip 320 helps to retain the cap 135 in position within the housing 105. As shown, the cap 135 at the crown 305 defines at least one orifice 330. When the cap 135 is installed, the orifice 330 is positioned offset relative to the rotational axis 203. The orifice 330 is configured to promote lubricant transfer between the reservoir 140 and the proximal bearing system 130.

In one version, the cap 135 is made from a sheet metal, such as steel, titanium, and/or aluminum, and the cap 135 is created through a stamping process. In another version, the cap 135 is made by injection molding plastic. In still yet another version, the cap 135 is manufactured via a three-dimensional printing process.

Figure 4:
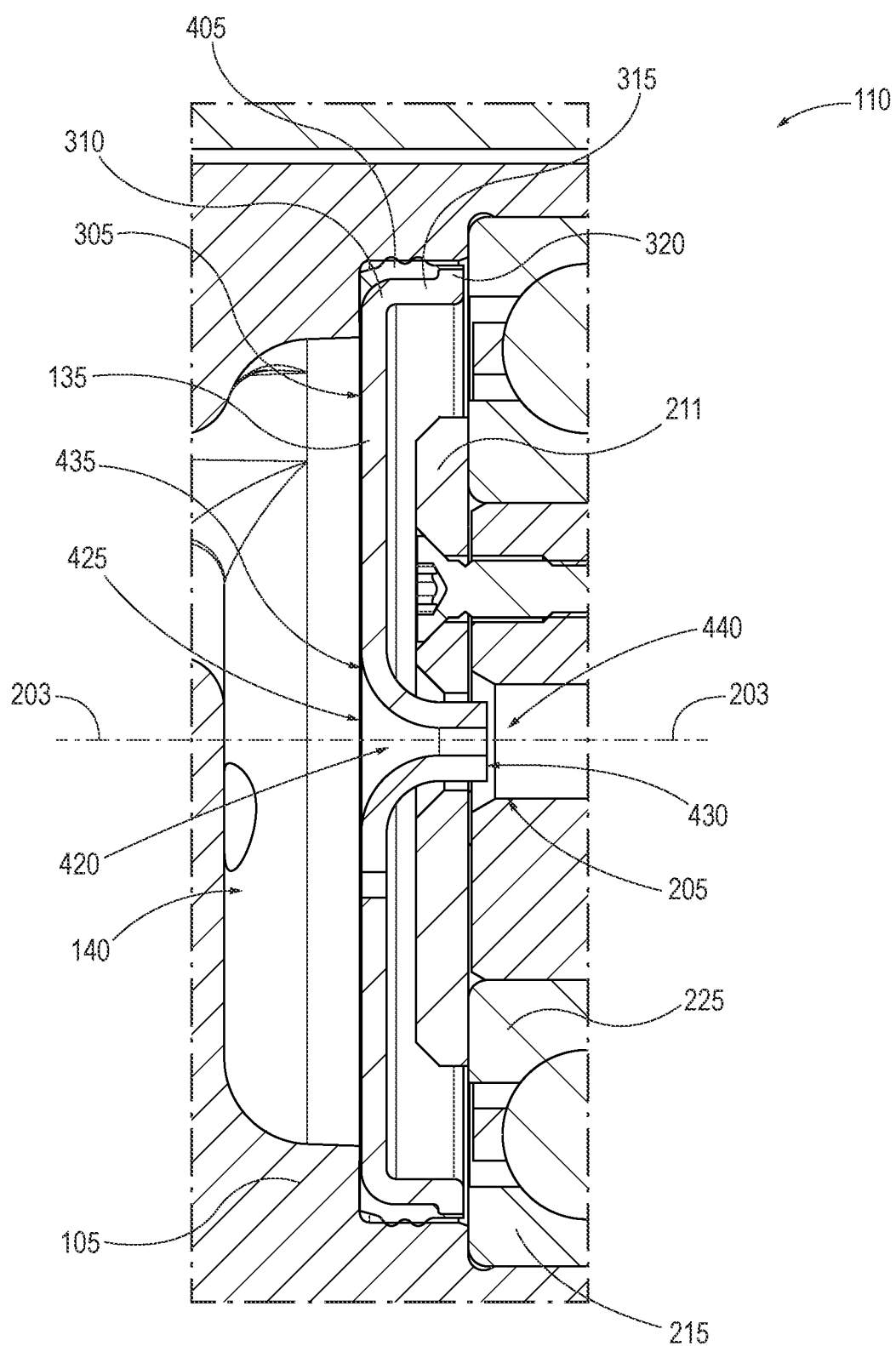
FIG. 4 is an enlarged cross-sectional view of one end of an intermediate shaft assembly.

FIG. 4 illustrates an enlarged cross-sectional view of the intermediate shaft assembly 110 with selected components removed to increase visibility on selected internal components. As shown, the collar 315 and the lip 320 keep the cap 135 from contacting the first end plate 211 to avoid abrasion and to form a flow path for the lubricant around the first end plate 211. The intermediate shaft assembly 110 has a cap seal 405 sandwiched between the collar 315 of the cap 135 and the housing 105. The cap seal 405 is configured to seal the reservoir 140 to minimize leakage of the lubricant. The lip 320 of the cap 135 helps to retain the cap seal 405 in place.

As shown, the cap 135 has a nozzle 420 that is configured to spray the lubricant from the reservoir 140 into the bore 204 of the intermediate shaft 120. The nozzle 420 extends from the crown 305 towards the first opening 205 of the bore 204 in the intermediate shaft 120. The nozzle 420 is positioned at the center of the cap 135. When the intermediate shaft assembly 110 is assembled, the center of the cap 135 at the nozzle 420 aligns with the rotational axis 203 of the intermediate shaft 120. The nozzle 420 is configured to guide lubricant flow by being shaped like a funnel. The nozzle 420 includes a reservoir opening 425 and a shaft opening 430. The reservoir opening 425 is positioned concentrically to the nozzle 420. The cap 135 defines the reservoir opening 425 at one end of the nozzle 420. In addition, the opposite end of the nozzle 420 defines the shaft opening 430. Like the reservoir opening 425, the shaft opening 430 is positioned concentrically to the nozzle 420. The reservoir opening 425 and the shaft opening 430 are configured to allow lubricant to pass through the cap 135. In the illustrated example, the reservoir opening 425 is designed to be larger in diameter than the shaft opening 430 in order to differentiate the flow speed between the reservoir opening 425 and the shaft opening 430. The nozzle 420 includes a nozzle inlet 435 and a nozzle outlet 440. The nozzle inlet 435 is positioned proximal to the reservoir opening 425. The nozzle inlet 435 extends from the cap 135 towards the nozzle outlet 440. The nozzle outlet 440 in turn extends from the nozzle inlet 435 towards the first opening 205 of the bore 204 in the intermediate shaft 120. The nozzle inlet 435 is designed to be in a curved shape to provide a smooth transition between the cap 135 and the nozzle outlet 440. As shown, the nozzle 420 extends through the first end plate 211 and into the bore 204 of the intermediate shaft 120.

Figure 5:
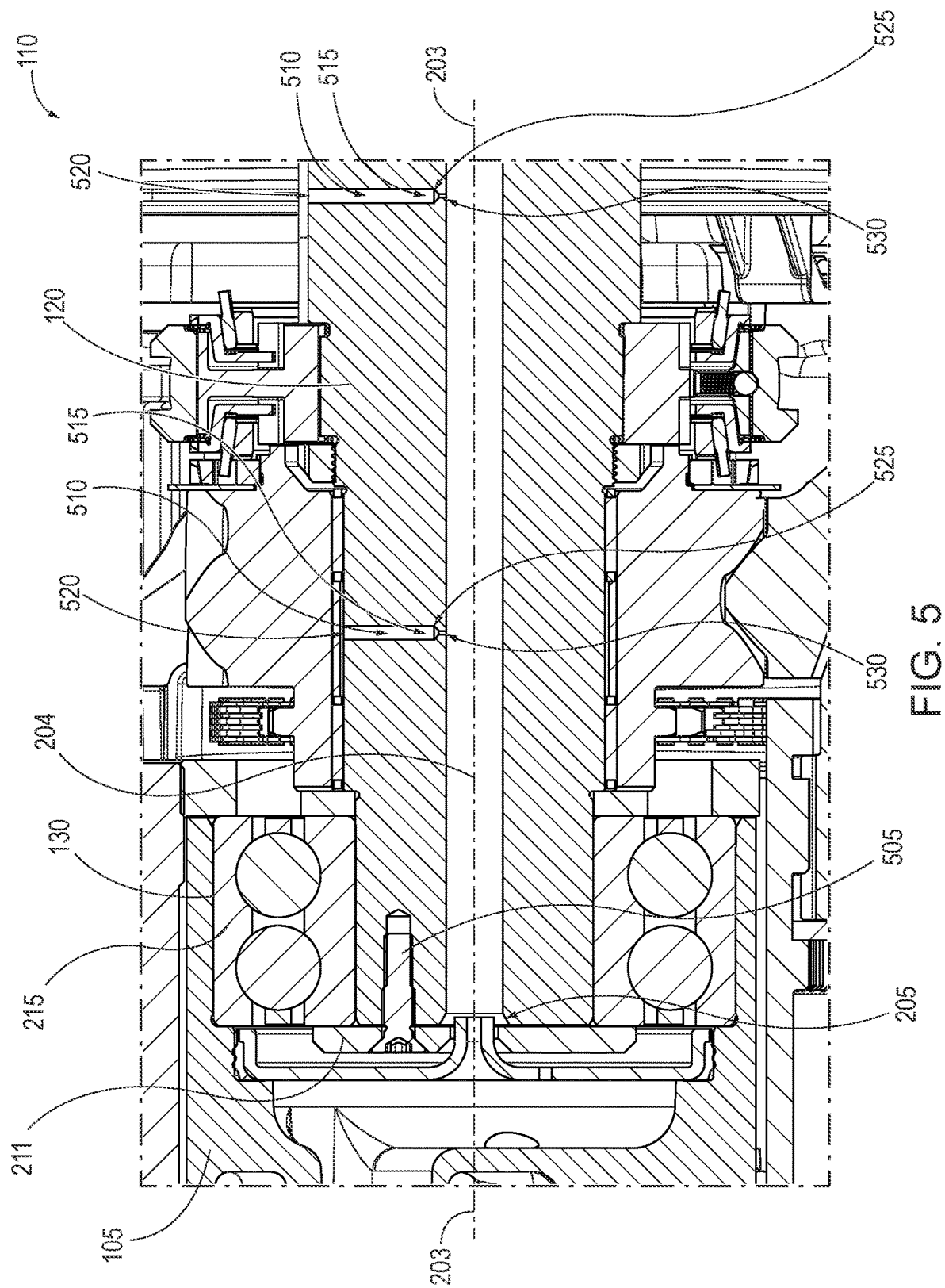
FIG. 5 is a cross-sectional view of the intermediate shaft assembly in the FIG. 1 powertrain system.

FIG. 5 illustrates a cross-sectional view of the intermediate shaft assembly 110 with selected components removed to increase visibility on selected internal components. As shown, the first end plate 211 is secured via a fastener 505 such as a bolt. The fastener 505 is inserted into the intermediate shaft 120. The fastener 505 retains the first end plate 211 in place on the intermediate shaft 120.

The intermediate shaft 120 defines one or more lubrication channels 510. Relative to the rotational axis 203, the lubrication channels 510 extend radially outward from the bore 204 through the wall of the intermediate shaft 120. The lubrication channels 510 promotes lubricant leakage to lubricate components outside the bore 204. In the illustrated example, the intermediate shaft 120 has two of the lubrication channels 510, both of which are positioned in between the proximal bearing system 130 and the distal bearing system 125. Each one of the lubrication channels 510 includes a channel inner opening 515 and a channel outer opening 520. The channel inner opening 515 is positioned at one end of the lubrication channel 510 proximal to the bore 204. The intermediate shaft 120 defines the channel inner opening 515. The channel inner opening 515 allows lubricant to flow into the lubrication channels 510. The channel outer opening 520 is positioned at an end opposite the channel inner opening 515 at the outer surface of the intermediate shaft 120. The outer surface of the intermediate shaft 120 defines the channel outer opening 520. The channel outer opening 520 allows lubricant flow outside the lubrication channels 510. Each of lubrication channels 510 further includes a channel nozzle 525. The intermediate shaft 120 defines the channel nozzle 525. The channel nozzle 525 facilitates lubricant flow from the bore 204 into the lubrication channels 510. The channel inner opening 515 is one end of the channel nozzle 525. The inner surface of the intermediate shaft 120 defines a channel nozzle opening 530 at the other end of the channel nozzle 525 opposite the channel inner opening 515. The channel nozzle opening 530 allows lubricant to flow from the bore 204 into the channel nozzle 525; then through the lubrication channels 510 to outside of the channel outer opening 520. According to one embodiment, the channel nozzle opening 530 is smaller in diameter than the channel inner opening 515, such that the flow speed coming from the lubricant in the bore 204 is reduced. The lubrication channels 510 are designed to lubricate and/or cool components located around the outside of the intermediate shaft 120.

Figure 6:
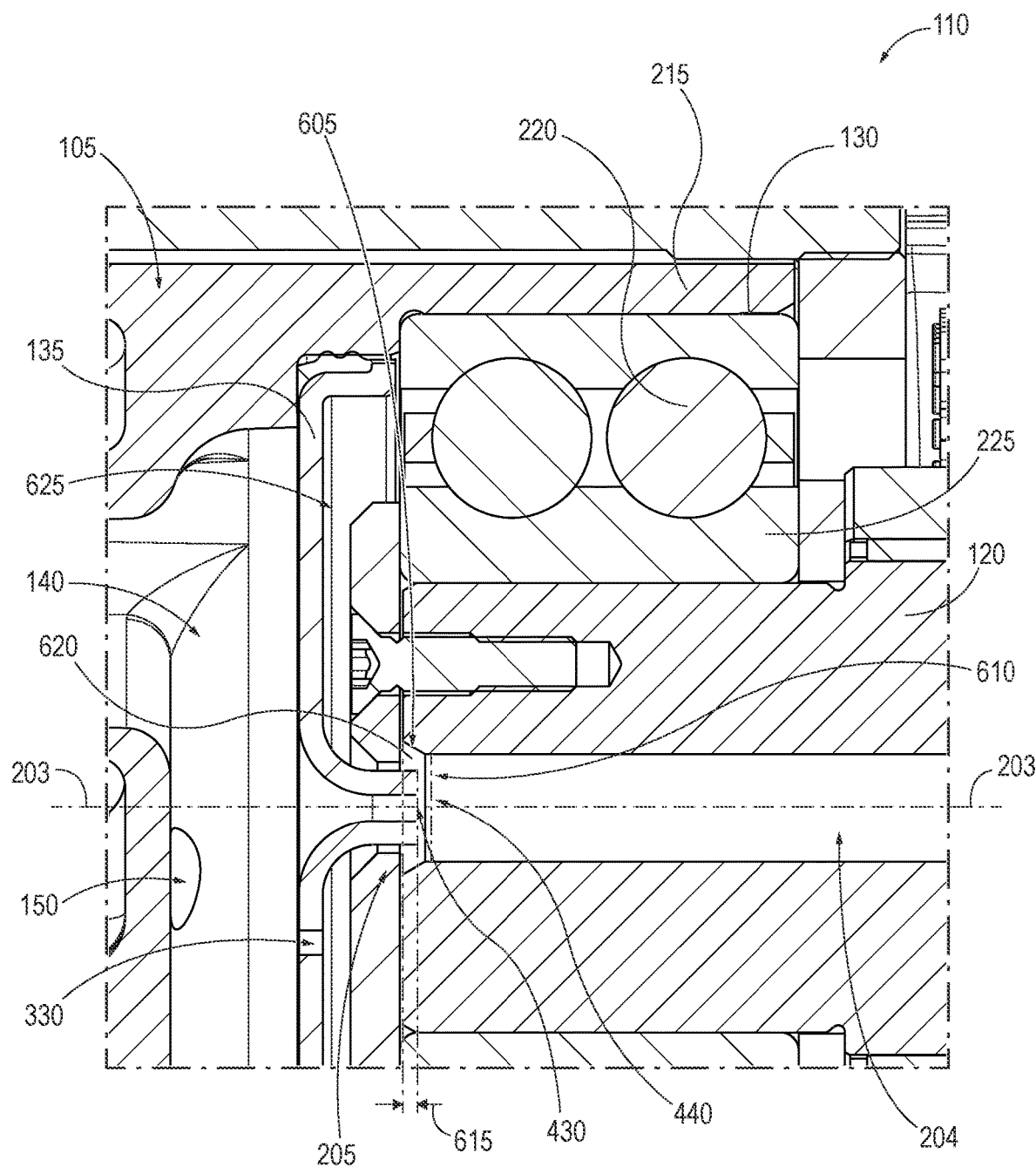
FIG. 6 is an enlarged cross-sectional view of the intermediate shaft assembly of FIG. 5.

FIG. 6 illustrates an enlarged cross-sectional view of the intermediate shaft assembly 110 shown in FIG. 5 with selected components removed to increase visibility of selected internal components. As shown, the intermediate shaft 120 defines a shaft inlet 605. The shaft inlet 605 has two openings. The first opening 205 is one of the two openings of the shaft inlet 605. The intermediate shaft 120 defines a shaft inlet opening 610. The shaft inlet opening 610 is the other opening of the shaft inlet 605. The shaft inlet opening 610 is positioned at an end of the shaft inlet 605 opposite the first opening 205. The shaft inlet opening 610 has the same diameter as the bore 204. The shaft inlet 605 allows lubricant flow from outside the bore 204 to inside the bore 204. In the illustrated example, the first opening 205 is larger in diameter than the shaft inlet opening 610, such that the shaft inlet 605 has a sloped shape to provide a transition between the first opening 205 and the shaft inlet opening 610. In other words, the intermediate shaft 120 at the shaft inlet 605 is beveled to form a countersink type hole opening.

The distance between the shaft opening 430 and the first opening 205 defines a nozzle insertion depth 615. In the illustrated example, the nozzle insertion depth 615 is shorter than the distance between the shaft inlet opening 610 and the first opening 205. According to one example, the nozzle insertion depth 615 is longer than the distance between the shaft inlet opening 610 and the first opening 205. According to another example, the nozzle insertion depth 615 is equal to the distance between the shaft inlet opening 610 and the first opening 205. The outer diameter of the nozzle outlet 440 is smaller than the diameter of the bore 204, such that the nozzle outlet 440 does not contact the inner surface of the intermediate shaft 120 to avoid abrasion. In the illustrated example, the nozzle outlet 440 and the shaft inlet 605 define a nozzle gap 620. The nozzle gap 620 facilitates lubricant leakage while the lubricant flows through the bore 204.

In the illustrated example, the first end plate 211, the proximal bearing system 130, and the cap 135 define a cap cavity 625. The cap cavity 625 ensures the cap 135 does not contact the first end plate 211 or the intermediate shaft 120 to avoid abrasion. The cap cavity 625 is connected with the bore 204 through the nozzle gap 620. The cap cavity 625 is configured to lower the lubricant pressure by reducing the lubricant flow speed between the bore 204 and the proximal bearing system 130.

Once more, the cap 135 has the orifice 330. The orifice 330 is positioned offset from the rotational axis 203. The orifice 330 is configured to promote lubricant transfer between the reservoir 140 and the cap cavity 625. The orifice 330 helps to ensure sufficient lubricant supply in case the lubricant flow is low from the nozzle gap 620.

Figure 7:
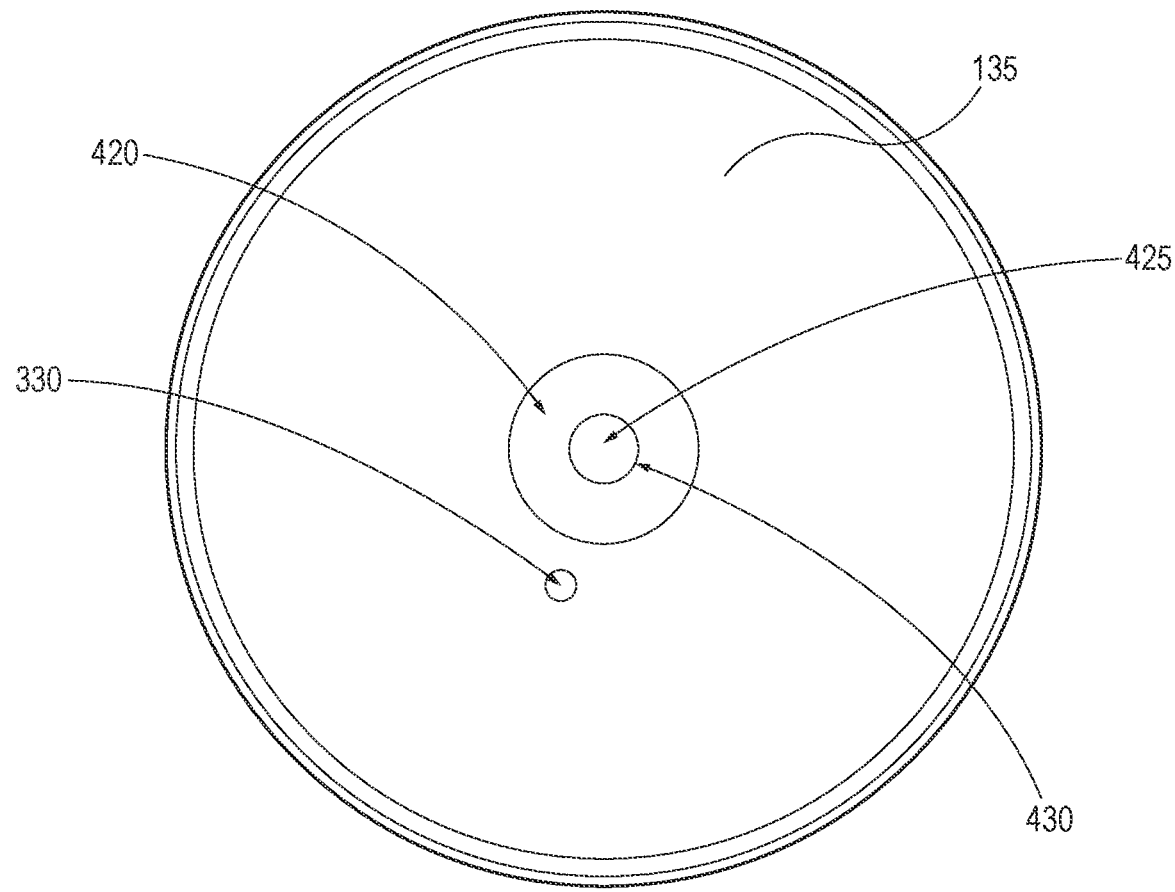
FIG. 7 is a view of the inner surface of the cap.

FIG. 7 illustrates a view of the inner surface of the cap 135. As shown, the nozzle 420 is positioned at the center of the cap 135. The nozzle 420 includes the reservoir opening 425 and the shaft opening 430 to allow lubricant to pass through the cap 135. The orifice 330 is positioned offset from the reservoir opening 425 in the crown 305. According to another example, multiple orifices 330 are offset from the reservoir opening 425 on the crown 305.

Figure 8:
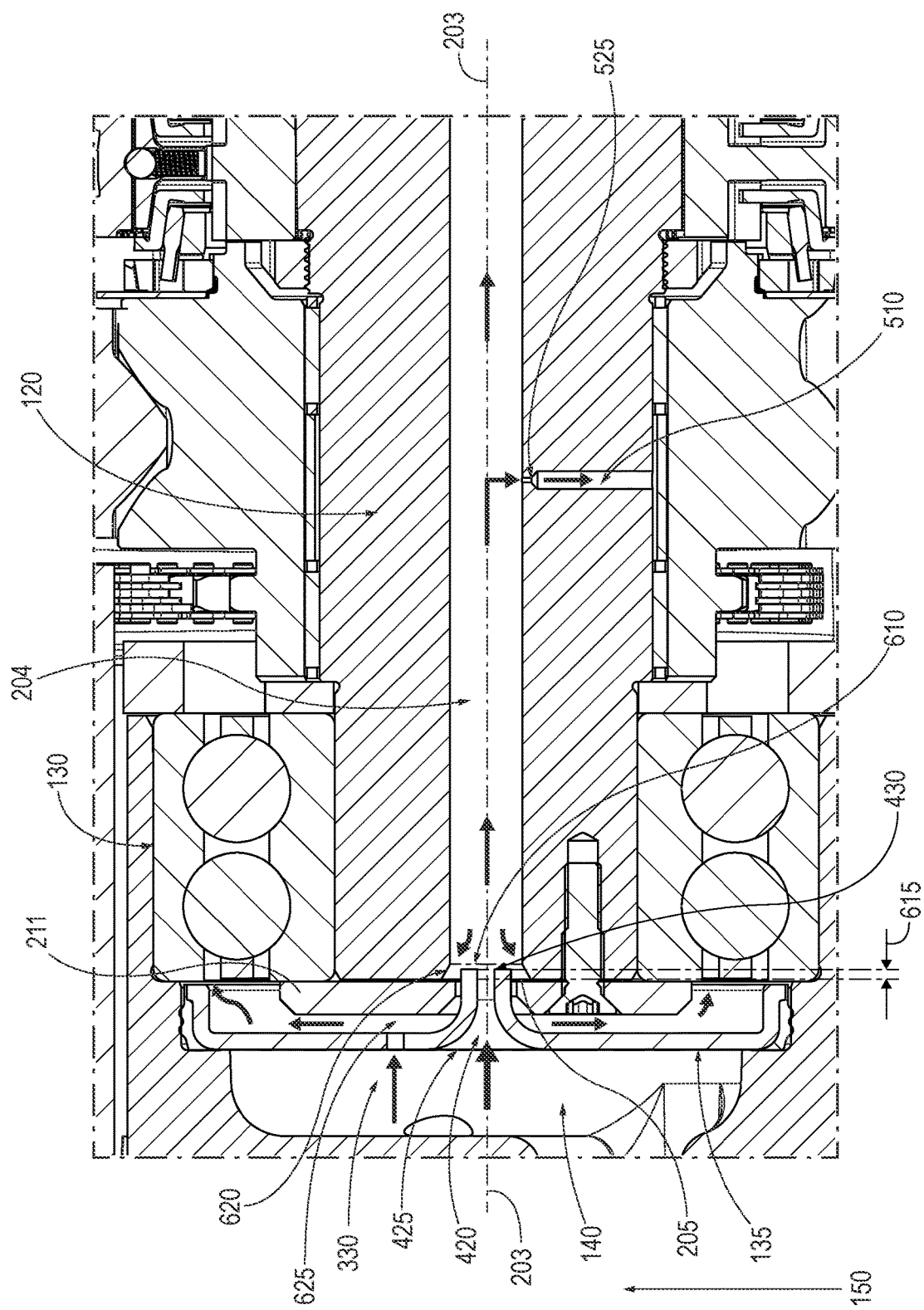
FIG. 8 is a cross-sectional view of the intermediate shaft assembly showing the lubricant flow path.

A technique for transferring lubricant between the reservoir 140 and the intermediate shaft 120 will now be generally described with reference to FIG. 8. Although the technique will be described with reference to the embodiment shown in FIG. 8, the technique can be adapted to handle lubricant flow in other types of shaft assemblies and in different environments. Generally speaking, the cap 135 is designed to allow controlled lubricant flow through a rotating shaft without using rotary seals. As noted before, the cap 135 allows the lubricant to flow to the intermediate shaft 120 under low pressure conditions. Moreover, the cap 135 reduces the need for expensive radial shaft seals and rotating seal rings so that the overall material costs are reduced.

During operation, the lubricant is pumped into the reservoir 140 through the lubricant supply passage 150. The cap 135 prevents the lubricant in the reservoir 140 from transferring into the intermediate shaft assembly 110 unrestrictedly. While the intermediate shaft 120 is rotating, the nozzle 420 sprays lubricant into the bore 204 in a controlled manner. The degree of control of the spray of the lubricant depends upon the shape and dimensions of the nozzle 420 such as the length of the nozzle insertion depth 615 and/or the diameter of the nozzle 420.

In the illustrated example, the nozzle insertion depth 615 is shorter than the distance between the shaft inlet opening 610 and the first opening 205. After the lubricant is sprayed into the bore 204, some of the lubricant leaks into the nozzle gap 620. While the intermediate shaft 120 and the first end plate 211 are rotating, the centrifugal force helps the lubricant flow into the cap cavity 625. The cap cavity 625 is designed to provide a pathway for lubricant to flow into the proximal bearing system 130 to lubricate components thereof. When there is an excessive amount of lubricant leaking into the nozzle gap 620, the cap cavity 625 is designed to be a buffer to store the excessive lubricant, thus reducing the flow speed and/or pressure of the lubricant.

According to one example, the nozzle insertion depth 615 is longer than the distance between the shaft inlet opening 610 and the first opening 205, such that the shaft opening 430 extends beyond the shaft inlet opening 610. As should be appreciated, lubricant is sprayed into the bore 204 farther away from the first opening 205. Since the nozzle gap 620 is larger in volume than the example shown, more time is required for the lubricant to travel from the nozzle gap 620 into the cap cavity 625. Therefore, the flow speed and/or pressure of the lubricant inside the cap cavity 625 is further reduced. In the illustrated example, the shaft opening 430 is smaller than the reservoir opening 425 in size.

As shown, the orifice 330 promotes lubricant leakage from the reservoir 140 into the cap cavity 625. The orifice 330 ensures the cap cavity 625 contains sufficient lubricant to lubricate the proximal bearing system 130 regardless of the amount of lubricant leak from the nozzle gap 620. Further, lubricant in the bore 204 flows into the channel nozzle 525. The channel nozzle 525 is designed to restrict the flow speed and/or the pressure of lubricant. Lubricant then flows from the channel nozzle 525 through the lubrication channels 510 to outside the intermediate shaft 120 to lubricate components surrounding the intermediate shaft 120.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Axis" generally refers to a straight line about which a body, object, and/or a geometric figure rotates or may be conceived to rotate.

"Bearing" generally refers to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Bore" generally refers to a long hollow passage of some mechanical part or other object. Typically, but not always, the bore has a cylindrical shape. In one form, the bore is usually a cylindrical hole made by the turning or twisting movement of a tool, such as a drill, but the bore can be formed in other ways.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operates in the reverse direction, accepting mechanical energy and converting the mechanical energy into electrical energy.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Gap" generally refers to a space between objects, surfaces, or points.

"Gearbox" or "Transmission" generally refers to a power system that provides controlled application of mechanical power. The gearbox uses gears and/or gear trains to provide speed and torque conversions from a rotating power source to another device.

"Hole" generally refers to a hollow portion through a solid body, wall or a surface. A hole may be any shape. For example, a hole may be, but is not limited to, circular, triangular, or rectangular. A hole may also have varying depths and may extend entirely through the solid body or surface or may extend through only one side of the solid body.

"Housing" generally refers to a component that covers, protects, and/or supports another thing. A housing can have a unitary construction or made of multiple components. The housing can be made from the same material or a combination of different materials. The housing can include a protective cover designed to contain and/or support one or more mechanical components. Some non-limiting examples of a housing include a case, enclosure, covering, body, and shell.

"Lateral" generally refers to being situated on, directed toward, or coming from the side.

"Longitudinal" generally refers to the length or lengthwise dimension of an object, rather than across.

"Lubricant" generally refers to a substance that is used to reduce friction between the surfaces of rotating or moving objects. For example, a lubricant may be an oil or grease that is used to reduce friction between ball bearings, interlocking gears, and/or other rotating parts in a motor or engine. In addition to reducing friction, lubricants may be used for other purposes. For example, lubricants may cool surfaces, transport particles, transmit forces, and/or perform other functions.

"Opening" generally refers to a space or hole that something can pass through.

"Powertrain" generally refers to devices and/or systems used to transform stored energy into kinetic energy for propulsion purposes. The powertrain can include multiple power sources and can be used in non-wheel-based vehicles. By way of non-limiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, electric motors, transmissions, drive shafts, differentials, and/or final drive components (e.g., drive wheels, continuous tracks, propeller, thrusters, etc.).

"Transmission" generally refers to a power system that provides controlled application of mechanical power. The transmission uses gears and/or gear trains to provide speed, direction, and/or torque conversions from a rotating power source to another device.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Vehicle" generally refers to a machine that transports people and/or cargo. Common vehicle types can include land-based vehicles, amphibious vehicles, watercraft, aircraft, and space craft. By way of non-limiting examples, land-based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 powertrain system
105 housing
110 intermediate shaft assembly
112 first drive shaft
113 differential
114 second drive shaft
115 electric motor
120 intermediate shaft
125 distal bearing system
130 proximal bearing system
135 cap
140 reservoir
150 lubricant supply passage
201 first end
202 second end
203 rotational axis
204 bore
205 first opening
210 second opening
211 first end plate
213 second end plate
215 first end outer bearing race
220 first end bearings
225 first end inner bearing race
230 second end bearing outer race
235 second end bearings
240 second end bearing inner race
305 crown
310 cap edge
315 collar
320 lip
330 orifice
405 cap seal
420 nozzle
425 reservoir opening
430 shaft opening
435 nozzle inlet
440 nozzle outlet
505 fastener
510 lubrication channels
515 channel inner opening
520 channel outer opening
525 channel nozzle
530 channel nozzle opening
605 shaft inlet
610 shaft inlet opening
615 nozzle insertion depth
620 nozzle gap
625 cap cavity

What is claimed is:

1. A system, comprising:
a housing defining a reservoir;
a shaft rotatably disposed in the housing;
wherein the shaft defines a bore;
a cap positioned to seal the reservoir;
wherein the cap defines an opening configured to supply lubricant to the shaft;
wherein the opening in the cap is positioned proximal the shaft to spray the lubricant into the bore;
wherein the cap includes a crown and a collar extending transverse to the crown;
a cap seal sandwiched between the cap and the housing;
wherein the cap seal wraps around the collar of the cap;
wherein the cap has a lip extending from the collar; and
wherein the lip of the cap retains the cap seal.

2. The system of claim 1, wherein:
the cap has a nozzle; and
the nozzle defines the opening configured to supply the lubricant to the shaft.

3. The system of claim 2, wherein:
the shaft is configured to rotate about a rotational axis;
the bore extends along the rotational axis of the shaft; and
the nozzle is aligned with the rotational axis of the shaft to spray the lubricant into the bore.

4. The system of claim 3, wherein the nozzle extends into the bore in the shaft.

5. The system of claim 2, further comprising:
a bearing disposed between the shaft and the housing to facilitate rotation of the shaft; and
wherein the nozzle and the shaft at the bore define a nozzle gap configured to facilitate flow of at least some of the lubricant to the bearing.

6. The system of claim 2, further comprising:
a bearing disposed between the shaft and the housing to facilitate rotation of the shaft;
an end plate secured to one end of the shaft; and
wherein the end plate is configured to secure the bearing to the shaft.

7. The system of claim 6, wherein the nozzle extends through the end plate.

8. The system of claim 6, wherein the cap is spaced from the end plate to facilitate flow of the lubricant to the bearing.

9. The system of claim 8, wherein:
the bearing includes an inner race and an outer race; and
the end plate engages the inner race of the bearing.

10. The system of claim 1, further comprising:
a bearing disposed between the shaft and the housing to facilitate rotation of the shaft; and
wherein the cap defines an orifice to supply the lubricant to the bearing.

11. The system of claim 1, wherein the shaft defines one or more lubrication channels configured to supply the lubricant from the bore to the outside of the shaft.

12. The system of claim 1, wherein the cap is configured to remain stationary as the shaft rotates.

13. The system of claim 1, wherein the lubricant in the reservoir is under low pressure.

14. A system, comprising:
a shaft, wherein the shaft is configured to rotate about a rotational axis;
wherein the shaft defines a bore;
wherein the bore extends along the rotational axis of the shaft;
wherein the bore in the shaft is configured to transport lubricant;
a housing defining a reservoir;
a cap positioned proximal to an end of the shaft;
wherein the cap is positioned to seal the reservoir;
wherein the cap has a nozzle;
wherein the nozzle is aligned with the rotational axis of the shaft to spray the lubricant into the bore;
wherein the cap includes a crown and a collar extending transverse to the crown;
wherein the cap has a lip extending from the collar;
a cap seal sandwiched between the cap and the housing;
wherein the cap seal wraps around the collar of the cap; and
wherein the lip of the cap retains the cap seal.

15. The system of claim 14, wherein:
the nozzle extends into the bore in the shaft; and
the cap is configured to remain stationary as the shaft rotates.

16. A system, comprising:
a housing defining a reservoir;
a shaft rotatably disposed in the housing;
wherein the shaft defines a bore;
a cap positioned to seal the reservoir;
wherein the cap defines an opening configured to supply lubricant to the shaft;
wherein the opening in the cap is positioned proximal the shaft to spray the lubricant into the bore;
wherein the cap has a nozzle;
wherein the nozzle defines the opening configured to supply the lubricant to the shaft;
wherein the shaft has an end surface that faces the cap;
wherein the shaft has a shaft inlet at the bore;
wherein the shaft inlet defines a first opening into the bore;
wherein the first opening is located at the end surface of the shaft;
wherein the shaft inlet defines a shaft inlet opening;
wherein the shaft inlet opening is located inside of the shaft distally away from the end surface of the shaft;
wherein the shaft inlet is beveled from the first opening to the shaft inlet opening to form a countersink type opening;
wherein the nozzle has a nozzle outlet;
wherein the nozzle outlet has a nozzle outlet end with the opening;
wherein the nozzle outlet end is disposed axially between the first opening and the shaft inlet opening to define a nozzle insertion depth;
wherein the nozzle outlet and the shaft inlet define a nozzle gap; and
wherein the nozzle gap facilitates lubricant leakage from the shaft inlet while the lubricant flows through the bore.

17. The system of claim 16, further comprising:
a bearing disposed between the shaft and the housing to facilitate rotation of the shaft;
an end plate secured to one end of the shaft;
wherein the end plate is configured to secure the bearing to the shaft; and
wherein the nozzle extends through the end plate.

18. The system of claim 17, wherein:
the bearing includes an inner race and an outer race; and
the end plate engages the inner race of the bearing.

19. The system of claim 18, wherein:
the cap includes a crown and a collar extending transverse to the crown; and
the collar is configured to engage the outer race of the bearing.

20. The system of claim 19, further comprising:
a cap seal sandwiched between the cap and the housing;
wherein the cap seal wraps around the collar of the cap;
wherein the cap has a lip extending from the collar; and
wherein the lip of the cap retains the cap seal.

21. The system of claim 17, wherein the shaft defines one or more lubrication channels configured to supply the lubricant from the bore to the outside of the shaft.

* * * * *